2,895,959
PROCESS FOR MANUFACTURE OF OXAZOLE QUATERNARY SALTS

Roy A. Jeffreys and Edward B. Knott, Harrow, England, assignors to Eastman Kodak Company, Rochester, N.Y., a corporation of New Jersey No Drawing. Application December 19, 1955
Serial No. 554,100

10 Claims. (Cl. 260—307)

This invention relates to a method of making cyanine dye intermediates, cyanine dyes made from such intermediates, and methods for making these dyes and intermediates.

The intermediates prepared according to our invention can advantageously be represented by the following general formula:

(I) 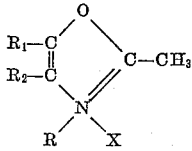

wherein R represents an alkyl group, such as methyl, ethyl, n-propyl, isopropyl, n-butyl, n-amyl, n-octyl, n-dodecyl, benzyl (methylphenyl), etc. (e.g., an alkyl group of the formula $C_nH_{2n+1}$ wherein $n$ represents a positive integer of from 1 to 12) or an aryl group, such as phenyl, o-, m- and p-tolyl, p-methoxyphenyl, etc. (e.g., a mononuclear aromatic group of the benzene series containing from 6 to 7 carbon atoms, especially such groups as unsubstituted phenyl and phenyl monosubstituted by simple substituents, such as alkyl, alkoxyl, etc.), $R_1$ and $R_2$ each represents an aryl group, such as phenyl, o-, m- and p-tolyl, p-chlorophenyl, p-methoxyphenyl, etc. (e.g., a mononuclear aromatic group of the benzene series containing from 6 to 7 carbon atoms, especially unsubstituted phenyl and phenyl monosubstituted by such groups as alkyl, alkoxyl, halogen, etc.) and X represents an acid radical or anion, such as chloride, bromide, iodide, perchlorate, thiocyanate, benzenesulphonate, p-toluenesulphonate, ethylsulphate, methylsulphate, etc.

It is, therefore, an object of our invention to provide a process for preparing cyanine dyes. Another object is to prepare a group of new cyanine dye intermediates. Still another object is to provide new optical sensitizing dyes and a method for making them. A further object is to provide silver halide emulsions containing these new dyes. Other objects will become apparent from a consideration of the following description and examples.

According to our invention, we provide intermediates selected from those represented by Formula I above by condensing a compound selected from those represented by the following general formula:

(II) 

wherein R, $R_1$ and $R_2$ each have the values given above, together with an acetyl halide selected from those represented by the following general formula:

(III) 

wherein hal represents a halogen atom, such as chloride, bromide, etc. The condensations proceed at room temperature, although elevated temperatures, up to the reflux temperature of the reaction mixture can be employed. The condensations are advantageously carried out in the presence of a dehydrating agent, such as carboxylic anhydrides (e.g., acetic anhydride, propionic anhydride, etc.). While an inert solvent, such as chloroform, diethyl ether, 1,4-dioxane, etc., can be employed in these condensations, there is generally no advantage in doing so, since the acid anhydrides provide sufficient fluidity for the products and reactants used. The compounds represented by Formula II can be employed in the form of their acid addition salts, hydrochlorides, hydrobromides, etc., for convenience. It will be recognized that the compounds of Formula II have been written in their enol tautomeric form. It is to be understood that our invention contemplates also the keto form of these well known compounds. The acid addition salts of the compounds represented by Formula II can be prepared according to the method described by Lutz et al.—"JACS," vol. 70, page 2016, and vol. 71, page 479.

While the above-described method yields compounds of Formula I wherein X is a halogen atom, compounds wherein X represents a different anion can be obtained by the conventional process of adding a water-soluble salt to the reaction mixture, thereby precipitating the compound of Formula I in a different anion form. This method is fully illustrated below. The compounds of Formula I can be condensed with an alkyl isoformanilide, e.g., ethyl isoformanilide, etc., to provide compounds represented by the following general formula:

(IV) 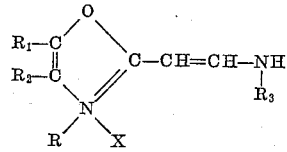

wherein R, $R_1$, $R_2$ and X each have the values given above and $R_3$ represents a mononuclear aromatic group of the benzene series, such as phenyl, tolyl, etc. The method of preparing the compounds of Formula IV above is fully set forth in Knott U.S. Patent 2,487,882, issued November 15, 1949, and British Patent 585,707, accepted February 20, 1947.

The compounds selected from those represented by Formula IV above can be condensed with a compound selected from those represented by the following two general formulas:

(V) 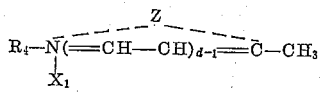

and (VI) 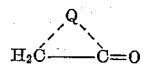

wherein $R_4$ represents an alkyl group, such as methyl, ethyl, n-propyl, n-butyl, β-hydroxyethyl, etc., $X_1$ represents an acid radical, such as those listed above for X, $d$ represents a positive integer of from 1 to 2, Z represents the non-metallic atoms necessary to complete a heterocyclic nucleus containing from 5 ($n$ is 1) to 6 ($n$ is 2) atoms in the heterocyclic ring, such as those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5 - bromobenzothiazole, 6 - bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thianaphtheno-7′,6′,4,5-thiazole series (e.g., 4′-methoxythianaphtheno-7′,6′,4,5-thiazole, etc.), those of the oxazole series (e.g., 4-methyloxazole, 5-methyloxazole, 4-phenyloxazole, 4,5-diphenyloxazole, 4-ethyloxazole, 4,5-diemthyloxazole, 5-phenyloxazole, etc.), those of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g., α-naphthoxazole, β-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the 2-quinoline series (e.g., quinoline, 6-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3-isoquinoline series (e.g., isoquinoline, etc.), those of the 3,3-dialkylindolenine series (e.g., 3,3-dimethylindolenine, 3,3,5-trimethylindolenine, 3,3,7-trimethylindolenine, etc.), the pyridine series (e.g., pyridine, 5-methylpyridine, etc.), etc., and Q represents the non-metallic atoms necessary to complete a heterocyclic nucleus containing from 5 to 6 atoms in the heterocyclic ring, such as those of the rhodanine series (i.e., 2-thio-2,4-thiazolidinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2-thio-2,4-oxazolidinedione series (i.e., those of the 2-thio-2,4-(3H,5H)-oxazoledione series) (e.g., 3-ethyl-2-thio-2,4-oxazolidinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3-phenyl-2-thio-2,4-imidazolinedione, 3-α-naphthyl-2-thio-2,4-imidazolinedione, 1,3-diethyl-2-thio-2,4-imidazolinedione, 1-ethyl-3-phenyl-2-thio-2,4-imidazolinedione, 1-ethyl-3-α-naphthyl-2-thio-2,4-imidazolinedione, 1,3-diphenyl-2-thio-2,4-imidazolinedione, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom). The resulting condensations yield, respectively, carbocyanine dyes represented by the following general formula:

(VII)

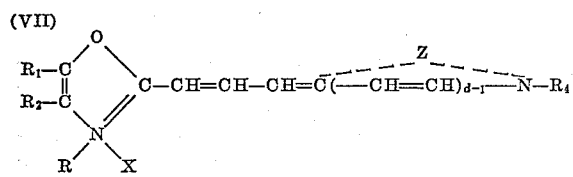

wherein R, $R_1$, $R_2$, $R_4$, X, d and Z each have the values given above, and merocarbocyanine dyes represented by the following general formula:

(VIII)

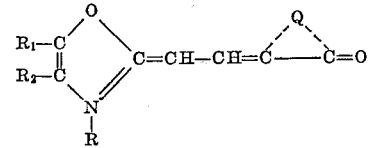

wherein R, $R_1$, $R_2$ and Q each have the values given above.

The compounds selected from those represented by Formula I above can also be condensed with a compound selected from those represented by the following general formula:

(IX)

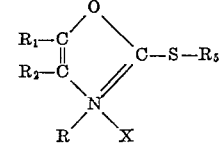

wherein R, $R_1$, $R_2$ and X each have the values given above, and $R_5$ represents a lower alkyl group, such as methyl, ethyl, etc., to provide simple syanine dyes. Such a process is fully described in the copending application of R. A. Jeffreys, Serial No. 468,135, filed November 10, 1954, now U.S. Patent 2,808,412, issued October 1, 1957. This method yields dyes corresponding to those represented by Formula Va in the Jeffreys application, the Z of that formula representing the non-metallic atoms necessary to complete a 4,5-diaryloxazole nucleus (d is 1).

The condensation of the compounds of Formula IV with those of Formula V or VI, as well as the condensation of the compounds of Formula I with those of IX, can advantageously be carried out in the presence of an inert diluent, such as the lower aliphatic alcohols (e.g., methanol, ethanol, n-propanol, n-butanol, etc.), 1,4-dioxane, pyridine, etc. The condensations can be carried out in the presence of a basic condensing agent, such as the trialkylamines (e.g., triethylamine, tripropylamine, triisopropylamine, tributylamine, etc.), the N,N-dialkylanilines (e.g., N,N-dimethylaniline, N,N-diethylaniline, etc.), the N-alkylpiperidines (e.g., N-methylpiperidine, N-ethylpiperidine, etc.), etc. Heat accelerates the condensations, although temperatures varying from room temperature (about 25° C.) to the reflux temperature of the reaction mixture can advantageously be employed.

The condensations of the compounds of Formula IV with those of V or VI can advantageously be carried out in the presence of a carboxylic anhydride (e.g., acetic anhydride, propionic anhydride, etc.). This method provides compounds corresponding to those of Formula IV wherein the acyclic nitrogen atom has been acylated. These intermediates are customarily referred to in the art as ICI intermediates. It has been found that forming these intermediates in situ provides a most advantageous means of preparing the dyes represented by Formulas VII and VIII.

The following examples will serve to illustrate more fully the method of practicing our invention.

*Example 1.—N-methyldesylamine hydrochloride*

Benzoin (100 g.), methylamine hydrochloride (5 g.), and aqueous methylamine (145 cc. of 30% solution) were refluxed on the steam bath for 4 hours. More methylamine (100 cc.) was added after 2 hours' refluxing. The solution was made alkaline with 2 N sodium carbonate, and water was added to precipitate the product as an oil. This oil was extracted with ether, and the ether was dried over sodium sulphate. HCl was then passed into the ether solution to precipitate N-methyldesylamine hydrochloride, and this was recrystallized from ethanol-ether as a white powder, M.P. 240° C. in 45 g., 43% yield.

*Example 2.—N-ethyldesylamine hydrochloride*

This was prepared according to the procedure of Example 1, using aqueous ethylamine and ethylamine hydrochloride. The yield of product, recrystallized from ethanol-ether, was 49%, M.P. 236° C.

*Example 3.—2,3-dimethyl-4,5-diphenyloxazolium perchlorate*

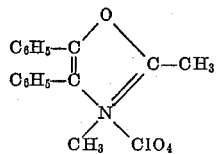

N-methyldesylamine-HCl (45 g.) and acetyl chloride (14 cc.) in acetic anhydride (240 cc.) were refluxed for 3 hours. The solvent was removed at the pump, and the residue was dissolved in a little ethanol. This solution was poured into aqueous sodium perchlorate, with stirring. The product, which precipitated, was filtered off, and recrystallized from ethanol-ether as fluffy plates, M.P. 156° C. (Found: Cl, 10.3. $C_{17}H_{16}O_5NCl$ requires Cl, 10.2%.) The yield was 32 g. (46%).

*Example 4.—3-ethyl-2-methyl-4,5-diphenyloxazolium perchlorate*

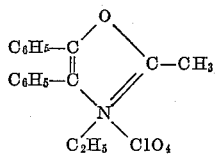

N-ethyldesylamine-HCl (11 g.) and acetyl chloride (3 cc.) in acetic anhydride (60 cc.) were refluxed together for 3 hours. The product was worked up as in Example 3, and was recrystallized from methanol-ether as cream leaflets, M.P. 151° C., in 9 g. (62%) yield. (Found: N, 3.8; Cl, 10.0. $C_{18}H_{18}O_5NCl$ requires N, 3.9; Cl, 9.8%.)

*Example 5.—2-methyl-3-octyl-4,5-diphenyoxazolium iodide*

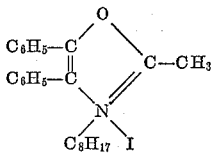

N-octyldesylamine-HCl (prepared according to Lutz, Freek, and Murphey, J. Amer. Chem. Soc., 1948, 70, 2015) (7.2 g.) and acetyl chloride (1.5 cc.) in acetic anhydride (40 cc.) were refluxed together for 3 hours. The product was worked up as in Example 3, and precipitated as the iodide (from aqueous potassium iodide). It was recrystallized from benzene-light petroleum, and then methanol-ether, as glistening leaflets, M.P. 130° C., in 6 g. (63%) yield. (Found: N, 2.7; I, 27.5. $C_{24}H_{30}ONI$ requires N, 2.9; I, 26.7%.)

*Example 6.—3-butyl-2-methyl-4,5-diphenyloxazolium iodide*

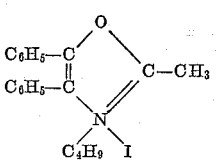

N-butyldesylamine-HCl (prepared according to Lutz, Freek, and Murphey, J. Amer. Chem. Soc., 1948, 70, 2015) (3.0 g.) and acetyl chloride (0.72 cc.) in acetic anhydride (20 cc.) were refluxed together for 3 hours. The product was worked up as in Example 5, and was recrystallized from ethanol-ether as flat glossy needles, M.P. 179° C., in 3.2 g. (77%) yield. (Found: N, 3.2; I, 31.0. $C_{20}H_{22}ONI$ requires N, 3.3; I, 30.3%.)

*Example 7.—2-methyl-3,4,5-triphenyloxazolium iodide*

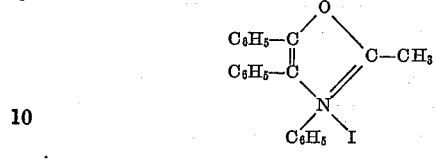

Desylaniline (prepared according to Wren, J.C.S., 1909, 95, 1601) (80 g.) and acetyl chloride (22 cc.) in acetic anhydride (400 cc.) were refluxed together for 2 hours. The product was worked up as in Example 5, and was recrystallized from methanol-ether as leaflets, M.P. 266° C., in 73 g. (60%) yield. (Found: N, 3.2; I, 29.3. $C_{22}H_{18}ONI$ requires N, 3.2; I, 28.9%.)

*Example 8.—2,2'-anilinovinyl-3-octyl-4,5-diphenyloxazolium iodide*

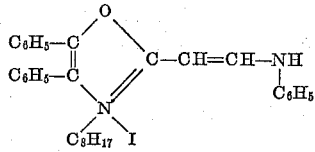

2-methyl-3-octyl-4,5-diphenyloxazolium iodide (19 g.) and ethylisoformanilide (6.4 cc.) were heated in an oil-bath at 140° C. for ½ hour. On cooling, the product solidified and was recrystallized from methanol-ether as bright yellow leaflets, M.P. 182° C., in 20 g. (87%) yield. (Found: C, 64.2; H, 6.2; N, 4.7; I, 22.8. $C_{31}H_{35}ON_2I$ requires C, 64.4; H, 6.1; N, 4.8; I, 22.0%.)

*Example 9.—2,2'-anilinovinyl-3,4,5-triphenyloxazolium iodide*

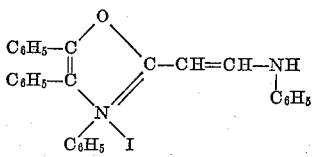

2-methyl-3,4,5-triphenyloxazolium iodide (14.7 g.) and ethylisoformanilide (5.5 g.) were heated for 1 hour at 140° C. On adding a little ethanol, and cooling, the product solidified, and was recrystallized from methanol-ether as orange-red prisms, M.P. 260° C., in 11.2 g. (62%) yield. (Found: N, 5.1; I, 23.4. $C_{29}H_{23}ON_2I$ requires N, 5.2; I, 23.4%.)

*Example 10.—Bis-(3-octyl-4,5-diphenyl-2-oxazole) methincyanine perchlorate*

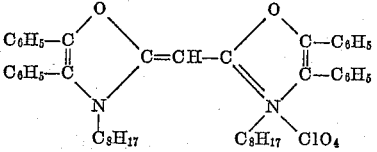

3-octyl-4,5-diphenyl-2-thio-oxazoline (1.8 g.) and methylsulphate (0.5 cc.) were heated for 1 hour on the steam bath. To the resulting oil was added 2-methyl-3-octyl-4,5-diphenyloxazolium iodide (2.4 g.), triethylamine (0.7 cc.), and ethanol (10 cc.). The solution was refluxed for 10 minutes and poured into aqueous sodium perchlorate. The product crystallized, and was recrystallized from methanol-ether as cream needles, M.P. 184° C., in 0.8 g. (21%) yield. (Found: N, 3.6; Cl, 4.6. $C_{47}H_{55}O_6N_2Cl$ requires N, 3.6; Cl, 4.6%.)

*Example 11.—3-ethyl-5-(3-octyl-4,5-diphenyloxazolin-2-ylidene-ethylidene)-2-thio-oxazolid-4-one*

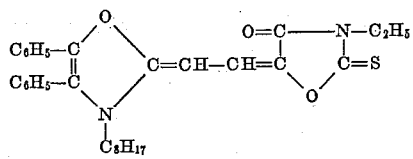

2,2'-anilinovinyl-3-octyl-4,5-diphenyloxazolium iodide (2.9 g.), 3-ethyl-2-thio-oxazolid-4-one (0.7 g.), acetic anhydride (0.5 cc.), triethylamine (1.4 cc.), and ethanol (10 cc.) were refluxed for 10 minutes. A few drops of water were added, and the solution was chilled and scratched. The product crystallized, and was filtered off. It was recrystallized from ethanol-water as orange needles, M.P. 103° C., in 1.7 g. (68%) yield. (Found: C, 71.5; H, 7.1; N, 5.5; S, 6.7. $C_{30}H_{34}O_3N_2S$ requires C, 71.7; H, 6.8; N, 5.6; S, 6.4%.) It sensitized a silver chlorobromide emulsion to 600 mu with a peak at 550 mu, and a silver bromoiodide emulsion to 580 mu with a peak at 550 mu.

*Example 12.—Bis-(3-octyl-4,5-diphenyl-2-oxazole)trimethincyanine iodide*

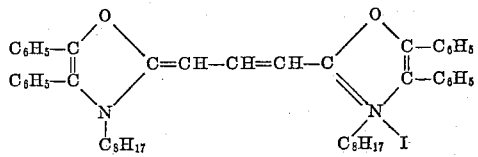

2 - methyl - 3 - octyl - 4,5 - diphenyloxazolium iodide (2.4 g.), 2,2' - anilinovinyl - 3 - octyl - 4,5 - diphenyloxazolium iodide (2.9 g.), acetic anhydride (0.5 cc.), triethylamine (1.4 cc.), and ethanol (10 cc.) were refluxed for ¼ hour. The solution was chilled, and ether (4 volumes) added. The dye which was precipitated was filtered, washed well with water, and recrystallized from methanolether as an orange sponge, M.P. 219° C., in 3.1 g. (75%) yield. (Found: N, 3.4; I, 15.6. $C_{49}H_{57}O_2N_2I$ requires N, 3.4; I, 15.3%.) It sensitized a silver chlorobromide emulsion to 580 mu with a peak at 540 mu, and a silver bromoiodide emulsion to 560 mu with a peak at 540 mu.

*Example 13.—Bis-(3,4,5-triphenyl-2-oxazole)methincyanine iodide*

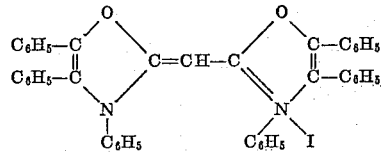

3,4,5-triphenyl-2-thio-oxazoline (1.6 g.) and methylsulphate (0.7 cc.) were heated for 1 hour on the steam bath. 2-methyl-3,4,5-triphenyloxazolium iodide (2.2 g.), triethylamine (0.7 cc.), and pyridine (10 cc.) were added, and the solution was refluxed for 10 minutes. The dye, after chilling and filtering the solution, was recrystallized from pyridine-ether as a lemon yellow powder, M.P. 330° C., in 1.1 g. (30%) yield. (Found: N, 3.8; I, 17.1. $C_{43}H_{31}O_2N_2I$ requires N, 3.8; I, 17.3%.)

*Example 14.—3-ethyl-5-(3,4,5-triphenyloxazolin-2-ylidene-ethylidene)-2-thio-oxazolid-4-one*

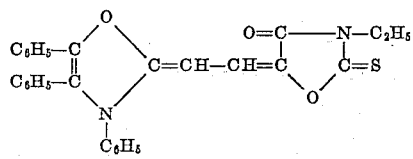

2,2' - anilinovinyl - 3,4,5 - triphenyloxazolium iodide (1.4 g.), 3-ethyl-2-thio-oxazolid-4-one (0.4 g.), acetic anhydride (0.25 cc.), triethylamine (0.7 cc.), and ethanol were refluxed for 10 minutes. The solution was chilled and filtered. The dye was recrystallized from benzene-light petroleum as red prisms, M.P. 250° C., in 0.65 g. (56%) yield. (Found: N, 6.0. $C_{28}H_{22}O_3N_2S$ requires N, 6.0%.) It sensitized a silver chlorobromide emulsion to 600 mu with a peak at 560 mu, and a silver bromoiodide emulsion to 580 mu with a peak at 550 mu.

*Example 15.—Bis-(3,4,5-triphenyl-2-oxazole)trimethincyanine iodide*

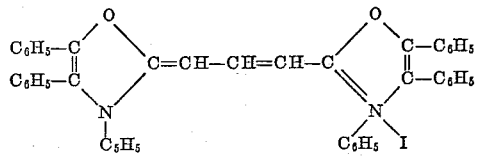

2-methyl-3,4,5-triphenyloxazolium iodide (2.2 g.), 2,2'-anilinovinyl-3,4,5-triphenyloxazolium iodide (2.7 g.), acetic anhydride (0.5 cc.), triethylamine (1.4 cc.), and ethanol (15 cc.) were refluxed for ½ hour. A few drops of water were added, and the solution was chilled and filtered. The dye was recrystallized from methanol-ether as a brick red powder, M.P. 301° C., in 1.9 g. (50%) yield. (Found: N, 3.7; I, 16.7. $C_{45}H_{43}O_2N_2I$ requires N, 3.7; I, 16.7%.) It sensitized a silver chlorobromide emulsion to 590 mu with a peak at 550 mu, and a silver bromoiodide emulsion to 580 mu with a peak at 550 mu.

*Example 16.—N-butyl-4,4'-dimethoxydesylamine hydrochloride*

4,4'-dimethoxybenzoin (62 g.) and butylamine (18.4 g.) with phosphorus pentoxide (2.3 g.) were heated together for 2 hours on the steam bath. After cooling the flask, water was added, and the mix was stirred, and extracted with ether. The ether extract was dried and saturated with hydrogen chloride. The substituted desylamine hydrochloride which was precipitated, was recrystallized from methanol-ether as colorless needles, M.P. 204° C., in 56 g. (68%) yield. (Found N, 3.7; Cl, 9.8. $C_{20}H_{26}O_3NCl$ requires N, 3.8; Cl, 9.8%.)

*Example 17.—3-butyl-4,5-di-4'-methoxyphenyl-2-methyloxazolium perchlorate*

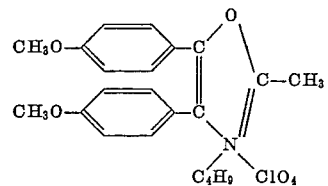

N-butyl-4,4'-dimethoxydesylamine hydrochloride (36.4 g.) and acetyl chloride (7.2 cc.) in acetic anhydride (200 cc.) were refluxed for 3 hours. The solvents were then removed at the pump, and the residue dissolved in ethanol and poured into excess aqueous sodium perchlorate. The product which precipitated was filtered off, and recrystallized from methanol-ether, as colorless needles, M.P. 181° C., in 37.5 g. (83%) yield. (Found: N, 3.1; Cl, 8.0. $S_{22}H_{26}O_7NCl$ requires N, 3.1; Cl 7.9%.)

*Example 18.—2,2'-anilinovinyl-3-butyl-4,5-di-4'-methoxyphenyl-oxazolium perchlorate*

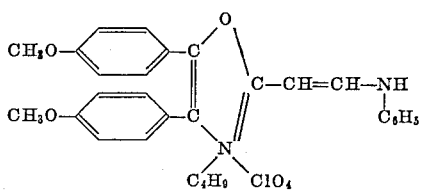

N - butyl - 4,5 - di - 4' - methoxyphenyl - 2 - methyl-oxazolium perchlorate (4.5 g.) and ethylisoformanilide (1.64 g.) were heated at 140° C. for ¼ hour. A little ethanol was added to the hot tar, and the product crystallized. Ether was added to the cooled solid, and the product was filtered off. It was ground with acetone-ether (1:4), and recrystallized from ethanol-ether as lemon yellow leaflets, M.P. 224° C., in 4.9 g. (88%) yield. (Found: N, 5.0; Cl, 6.6. $C_{29}H_{31}O_7N_2Cl$ requires N, 5.1; Cl, 6.4%.)

*Example 19.—Bis-(3-butyl-4,5-di-4'-methoxyphenyl-2-oxazole)tri-methincyanine perchlorate*

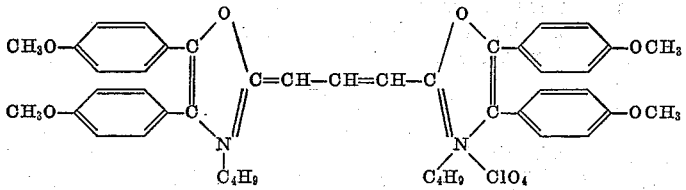

3-butyl-4,5-di-4'-methoxyphenyl-2-methyloxazolium perchlorate (2.25 g.) and 2,2'-anilinovinyl-3-butyl-4,5-di-4'-methyoxyphenyloxazolium perchlorate (2.75 g.) with acetic anhydride (0.5 cc.) and triethylamine (1.4 cc.) in ethanol (20 cc. were refluxed for ½ hour. The dye, which crystallized on chilling the solution, was recrystallized from methanol-ether as orange leaflets, M.P. 203° C. in 2.7 g. (67%) yield. (Found: N. 3.3; Cl, 4.5. $C_{45}H_{49}O_{10}N_2Cl$ requires N, 3.4; Cl, 4.4%.) It sensitized a silver chlorobromide emulsion to 590 mu with a peak at 550 mu, and a silver bromoiodide emulsion to 570 mu with a peak at 550 mu.

*Example 20.—5-(3-butyl-4,5-di-4'-methoxyphenyloxazolin-2-ylidene-ethylidene)-3-ethyl-2-thio-oxazolid-4-one*

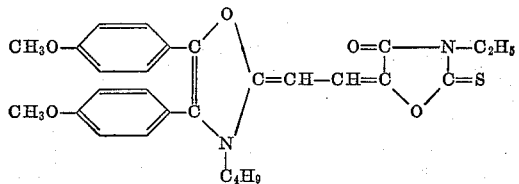

2,2'-anilinovinyl-3-butyl-4,5-di-4'-methoxyphenyloxazolium perchlorate (2.75 g.) and 3-ethyl-2-thio-oxazolid-4 one (0.73 g.) with acetic anhydride (0.5 cc.) and triethylamine (1.4 cc.) in ethanol (20 cc.), were refluxed together for 10 minutes, and the solution was chilled and filtered. The dye was recrystallized from benzene-light petroleum as orange needles, M.P. 142° C., in 2.0 g. (40%) yield. (Found: N, 5.2; S, 6.2. $C_{28}H_{30}O_5N_2S$ requires N, 5.5; S, 6.3%.) It sensitized a silver chlorobromide emulsion to 590 mu with a peak at 560 mu, and a silver bromoiodide emulsion to 570 mu with a peak at 560 mu.

*Example 21.—5-(3-butyl-4,5-di-4'-methoxyphenyloxazolin-2-ylidene-ethylidene)-1,3-diethyl-2-thiohydantoin*

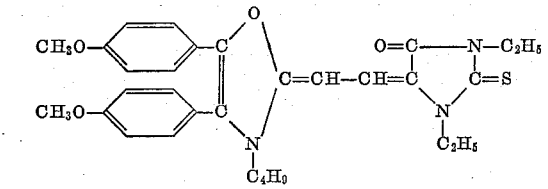

2,2'-anilinovinyl-3-butyl-4,5-di-4'-methoxyphenyloxazolium perchlorate (2.75 g.) and 1,3-diethyl-2-thiohydantoin (0.86 g.) with acetic anhydride (0.5 cc.) and triethylamine (1.4 cc.) in ethanol (20 cc.) were refluxed together for 10 minutes, and the solution then chilled and filtered. The dye was recrystallized from benzene-light petroleum as red needles, M.P. 186° C., in 2.2 g. (41%) yield. (Found: N, 7.7; S, 6.0. $C_{30}H_{35}O_4N_3S$ requires N, 7.9; S, 6.0%.) It sensitized a silver chlorobromide emulsion to 600 mu with a plate at 560 mu, and a silver bromoiodide emulsion to 570 mu with a peak at 550 mu.

The new dyes of our invention, as shown above, are useful in spectrally sensitizing photographic silver halide emulsions when incorporated therein. The dyes are especially useful for extending the spectral sensitivity of the customarily employed gelatino-silver-chloride, gelatino-silver-chlorobromide, gelatino-silver-bromide, gelatino-silver-bromiodide, and gelatino-silver-chlorobromiodide developing-out emulsions. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or acetone has proved satisfactory as a solvent for most of our new dyes. The dyes are advantageously incorporated in the finished, washed emulsions and should be uniformly distributed throughout the emulsions.

The concentration of the dyes in the emulsions can vary widely, e.g., from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in pyridine or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is uniformly dispersed in the emulsion.

With most of our dyes, from 10 to 20 mg. of dye per liter of gelatino-silver-bromide or -bromiodide emulsion (containing about 40 g. of silver halide) suffices to produce the maximum sensitizing effect. With the finer grain emulsions, somewhat larger concentrations of dye may be needed to produce the maximum sensitizing effect.

The above statements are only illustrative, as it will be apparent that the dyes can be incorporated in photographic emulsions by any of the other methods customarily employed in the art, e.g., by bathing a plate or film upon which the emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of my invention can also contain such addenda as chemical sensitizers (e.g., sulphur sensitizers, such as allyl thiocarbamide, thiourea, allylisothiocyanate, cystine, etc.), various gold compounds, such as potassium chloroaurate, auric trichloride, etc. (see U.S. Patents 2,540,085; 2,597,856; and 2,597,915, for example), various palladium compounds (such as palladium chloride (U.S. 2,540,086), potassium chloropalladate (U.S. 2,598,079), etc., etc. or mixtures of such sensitizers), antifoggants (e.g., benzotriazole, nitrobenzimidazole, 5-nitroindazole, etc., (see Mees—"The Theory of the Protographic Process," Macmillan Pub., 1942, p. 460), or mixtures thereof), hardeners (e.g., formaldehyde (U.S. 1,763,533), chrome alum (U.S. 1,763,533), glyoxal (Ger. 538,713), dibromacrolein (Br. 406,750), etc.), color couplers (e.g., such as those described in U.S. Patent 2,423,730, Spence and Carroll U.S. 2,640,776, etc.), or mixtures of such adenda. Dispersing agents for color couplers, such as substantially water-insoluble, high boiling crystalloidal materials, such as those set forth in U.S. Patents 2,322,027 and 2,304,940, can also be employed in the above-described emulsions.

As can be seen by reference to the above examples, dyes represented by Formula VII can be prepared according to our invention wherein Z represents the nonmetallic atoms necessary to complete a heterocyclic nucleus of the oxazole series wherein $R_4$ represents an aryl group, such as those defined above for $R_1$ and $R_2$. Also, it is to be understood that the process of our invention can utilize the compounds of Formula II in the form of their bases. Under such conditions, it is readily apparent that a hydrohalide is given off in the reaction and this reacts immediately with any basic material present. Thus, when using a free base of a compound of Formula II, after a short time the reaction mixture contains not only free base but an acid-addition salt of the compound of Formula II. Such matters are well understood in the art.

What we claim as our invention and desire secured by Letters Patent of the United States is:

1. A method of making oxazole quaternary salts comprising intermixing a member selected from the group consisting of a compound selected from those represented by the following general formula:

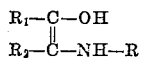

wherein R represents a member selected from the group consisting of an alkyl group of the formula $C_nH_{2n+1}$ wherein $n$ represents a positive integer of from 1 to 12 and a mononuclear aromatic group of the benzene series containing from 6 to 7 carbon atoms, and $R_1$ and $R_2$ each represents a mononuclear aromatic group of the benzene series containing from 6 to 7 carbon atoms and and acid-addition salt of said compound, together with an acetyl halide at a temperature varying from room temperature to the reflux temperature of the reaction mixture for a time sufficient to form said oxazole quaternary salts, and separating said oxazole quaternary salts from the reaction mixture.

2. A method of making oxazole quaternary salts comprising intermixing an acid-addition salt of a compound selected from those represented by the following general formula:

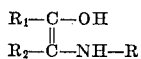

wherein R represents an alkyl group of the formula $C_nH_{2n+1}$ wherein $n$ represents a positive integer of from 1 to 12, and $R_1$ and $R_2$ each represents a mononuclear aromatic group of the benzene series containing from 6 to 7 carbon atoms, together with an acetyl halide at a temperature varying from room temperature to the reflux temperature of the reaction mixture for a time sufficient to form said oxazole quaternary salts, and separating said oxazole quaternary salts from the reaction mixture.

3. A process of making oxazole quaternary salts comprising intermixing an acid-addition salt of a compound selected from those represented by the following general formula:

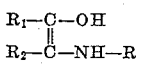

wherein R, $R_1$ and $R_2$ each represents a mononuclear aromatic group of the benzene series containing from 6 to 7 carbon atoms, together with an acetyl halide at a temperature varying from room temperature to the reflux temperature of the reaction mixture for a time sufficient to form said oxazole quaternary salts, and separating said oxazole quaternary salts from the reaction mixture.

4. A method of making oxazole quaternary salts comprising intermixing in the presence of a carboxylic anhydride an acid-addition salt of a compound selected from those represented by the following general formula:

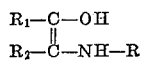

wherein R represents an alkyl group of the formula $C_nH_{2n+1}$ wherein $n$ representes a positive integer of from 1 to 12, and $R_1$ and $R_2$ each represents a mononuclear aromatic group of the benzene series containing from 6 to 7 carbon atoms, together with an acetyl halide at a temperature varying from room temperature to the reflux temperature of the reaction mixture for a time sufficient to form said oxazole quaternary salts, and separating said oxazole quaternary salts from the reaction mixture.

5. A process of making oxazole quaternary salts comprising intermixing in the presence of a carboxylic anhydride an acid-addition salt of a compound selected from those represented by the following general formula:

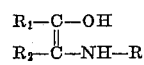

wherein R, $R_1$ and $R_2$ each represents a mononuclear aromatic group of the benzene series containing from 6 to 7 carbon atoms, together with an acetyl halide at a temperature varying from room temperature to the reflux temperature of the reaction mixture for a time sufficient to form said oxazole quaternary salts, and separating said oxazole quaternary salts from the reaction mixture.

6. A method of making an oxazole quaternary salt comprising intermixing N-methyldesylamine-hydrochloride together with acetyl chloride in the presence of acetic anhydride at a temperature varying from room temperature to the reflux temperature of the reaction mixture for a time sufficient to form said oxazole quaternary salt, and separating said oxazole quaternary salt from the reaction mixture.

7. A process of preparing an oxazole quaternary salt comprising intermixing N-ethyldesylamine-hydrochloride together with acetyl chloride in the presence of acetic anhydride at a temperature varying from room temperature to the reflux temperature of the reaction mixture for a time sufficient to form said oxazole quaternary salt, and separating said oxazole quaternary salt from the reaction mixture.

8. A process of preparing an oxazole quaternary salt comprising intermixing N-octyldesylamine-hydrochloride together with acetyl chloride in the presence of acetic anhydride at a temperature varying from room temperature to the reflux temperature of the reaction mixture for a time sufficient to form said oxazole quaternary salt, and separating said oxazole quaternary salt from the reaction mixture.

9. A process of preparing an oxazole quaternary salt comprising intermixing N-butyldesylamine-hydrochloride together with acetyl chloride in the presence of acetic anhydride at a temperature varying from room temperature to the reflux temperature of the reaction mixture for a time sufficient to form said oxazole quaternary salt, and separating said oxazole quaternary salt from the reaction mixture.

10. A process of preparing an oxazole quaternary salt comprising intermixing desylaniline together with acetyl chloride in the presence of acetic anhydride at a temperature varying from room temperature to the reflux temperature of the reaction mixture for a time sufficient to form said oxazole quaternary salt, and separating said oxazole quaternary salt from the reaction mixture.

References Cited in the file of this patent

UNITED STATES PATENTS

| | | |
|---|---|---|
| 2,088,996 | Hoffer | Aug. 3, 1937 |
| 2,107,379 | Koslowsky | Feb. 8, 1938 |
| 2,112,140 | Brooker | Mar. 22, 1938 |
| 2,474,426 | Kendall et al. | June 28, 1949 |
| 2,694,071 | Jacob | Nov. 9, 1954 |
| 2,752,357 | Watanabe | June 26, 1956 |

OTHER REFERENCES

Jeffreys: J. Chem. Soc., vol. 1952, cols. 4823–32.

Elderfield: Heterocyclic Compounds, vol. 5, p. 422 (1957).